US 7,908,565 B2

(12) United States Patent
Katsuranis (10) Patent No.: US 7,908,565 B2
(45) Date of Patent: Mar. 15, 2011

(54) VOICE ACTIVATED SYSTEM AND METHOD TO ENABLE A COMPUTER USER WORKING IN A FIRST GRAPHICAL APPLICATION WINDOW TO DISPLAY AND CONTROL ON-SCREEN HELP, INTERNET, AND OTHER INFORMATION CONTENT IN A SECOND GRAPHICAL APPLICATION WINDOW

(76) Inventor: Ronald M. Katsuranis, Belmont, CA (US)

( * ) Notice: Subject to any disclaimer, the term of this patent is extended or adjusted under 35 U.S.C. 154(b) by 0 days.

(21) Appl. No.: 12/100,155

(22) Filed: Apr. 9, 2008

(65) Prior Publication Data

US 2008/0256483 A1 Oct. 16, 2008

Related U.S. Application Data

(62) Division of application No. 10/775,587, filed on Feb. 9, 2004, now Pat. No. 7,461,352.

(51) Int. Cl.
*G06F 3/048* (2006.01)
(52) U.S. Cl. .................................. 715/781; 715/728
(58) Field of Classification Search .................. 715/800, 715/728, 781
See application file for complete search history.

(56) References Cited

U.S. PATENT DOCUMENTS

| 5,555,364 | A | * | 9/1996 | Goldstein | 715/797 |
|---|---|---|---|---|---|
| 5,721,849 | A | * | 2/1998 | Amro | 715/802 |
| 5,890,123 | A | * | 3/1999 | Brown et al. | 704/270.1 |
| 6,002,862 | A | * | 12/1999 | Takaike | 703/17 |
| 6,025,841 | A | | 2/2000 | Finkelstein et al. | |
| 6,535,615 | B1 | * | 3/2003 | Zachmann et al. | 382/100 |
| 6,692,256 | B2 | * | 2/2004 | Chan et al. | 434/118 |
| 6,813,768 | B1 | * | 11/2004 | Cragun | 718/107 |
| 2002/0130895 | A1 | * | 9/2002 | Brandt et al. | 345/708 |
| 2002/0174147 | A1 | * | 11/2002 | Wang et al. | 707/513 |
| 2003/0058267 | A1 | * | 3/2003 | Warren | 345/705 |
| 2003/0169296 | A1 | * | 9/2003 | Ito | 345/770 |
| 2003/0184592 | A1 | | 10/2003 | Awada et al. | |

* cited by examiner

*Primary Examiner* — Dennis-Doon Chow
*Assistant Examiner* — Le Nguyen
(74) *Attorney, Agent, or Firm* — Howard H. Sheerin (57) ABSTRACT

A system is disclosed for displaying a second window of a second application while a first window of a first application has input focus in a windowed computing environment having a voice recognition engine. The system comprises a retriever for launching the second application, a user command receiver for receiving commands from the voice recognition engine, and an application manager. The application manager responds to a command from the user command receiver by invoking the retriever to launch the second application and display the second window while the first window maintains substantially uninterrupted input focus.

4 Claims, 8 Drawing Sheets

VOICE ACTIVATED SYSTEM AND METHOD TO ENABLE A COMPUTER USER WORKING IN A FIRST GRAPHICAL APPLICATION WINDOW TO DISPLAY AND CONTROL ON-SCREEN HELP, INTERNET, AND OTHER INFORMATION CONTENT IN A SECOND GRAPHICAL APPLICATION WINDOW

This application is a divisional of U.S. patent application Ser. No. 10/775,587 Filed on Feb. 9, 2004 the specification of which is incorporated herein by reference.

CROSS-REFERENCE TO RELATED APPLICATIONS

This application claims priority of provision patent application No. 60/446,261 filed Feb. 10, 2003.

STATEMENT REGARDING FEDERALLY SPONSORED RESEARCH: OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Modern computer systems are often equipped with speech recognition technology. In a typical system, a computer user opens a graphical application window and starts typing or dictating input such as text, numerical information or drawing. In order to ensure accuracy, the user often starts organizing information and checking the facts. The user may open files on his or her computer or perform searches on the Internet, read and page through the information obtained, and follow relevant links by clicking on them. As the computer user writes the document, he or she will toggle between the various graphical windows and page through them, trying to find and check information. While working, the user may also refer to the help provided by his or her application to assist in formatting the work.

However, as the user opens other application windows, the first or primary graphical application window becomes partially or totally obscured by one or more other application windows that the computer user later opens. The user may use the mouse or other pointing device to position and size some or all of these application windows, but every time he or she opens another application it needs to be resized. Trying to view and copy and paste the information content from various files into a working application window often becomes awkward and frustrating as each window obscures other windows.

Another issue with current windowing systems is that the user must explicitly switch the "input focus." A window is said to have "focus" when it is active and currently designated to receive the user input from the keyboard, mouse, or from a voice recognition system. A computer user must switch back and forth between the first application window and the other application windows, in order to control or manipulate the activity or screen displayed in any graphical application window. Whether switching the focus is achieved manually (e.g., by keyboard or mouse) or by oral command, switching focus back and forth is a nuisance and easily creates frustration for the user.

For example, suppose a user has his or her primary graphical application window and a second application window displayed simultaneously on a computer screen, each in a separate window, with input focus in the first application window. When the user needs to page down in a second application window's displayed text, the user typically must move the mouse cursor to the second application window's display, click the mouse to move input focus, press the page down key, move the mouse cursor back to the original location in the first application window, and finally click the mouse to restore the input focus. This requires four conscious steps requiring some dexterity to perform smoothly, thereby interrupting the user's attention. It is also very common for the user to forget to move input focus back to the first application window until reminded by the failure of the first application to respond to new keyboard input, causing frustration and lost time.

Another source of frustration and difficulty in modern graphic user interfaces (GUIs) is overlapping windows. Overlapping windows result in the obstruction of a user's view of his or her primary graphical application window, and the loss of focus and attention to the first window application are issues that continue to plague prior art. Many methods have been developed to address these difficulties. For instance, U.S. Pat. No. 5,715,415 (the '415 patent) provides users with "automatic tiling" and retention of focus in the application as the user clicks into their built-in help systems. However, the '415 patent is limited to working only with help systems, with window panes, and with built-in help systems. The '415 patent additionally shares another weakness with other help systems. Virtually all modern help systems provide hyperlinks to web pages, so that their users can find more complete and recent information. Typically, as soon as a computer user clicks on a hyperlink to access the web, an internet application window such as Microsoft's Internet Explorer opens, partially or totally obscuring the user's first application and causes the user to lose focus from his or her graphical application window.

U.S. Patent Application No. 2002/0130,895 (the '895 patent application) partially solves this problem by simultaneously displaying portions of a web page next to help information the user requested. However, the '895 patent application only works with help information and still causes the user to lose focus from his or her first application. The user is again confronted with the inconsistencies and frustrations pursuant to the shifting of computer focus between first application and content. These problems are exacerbated by the frequency with which the user needs to click into the Internet application to follow links.

U.S. Pat. No. 5,699,486 (the '486 patent) provides an alternative approach that provides help content via visual help or aural speech. If the user requests help via aural speech, the '486 patent makes it possible for the computer user to receive help while simultaneously viewing his or her first application window. A limitation with the '486 patent approach is that aural speech simply disappears after being spoken and must be remembered by the user. The '486 patent has the additional limitation that help for complex situations is much harder to understand and often fail to result in a useful action when received aurally, compared to being arrayed on a display screen. The '486 patent does not provide a method to prevent the user from losing focus every time the user needs to click a hypertext link to play back the requested help. Also, the '486 patent does allow a user to view help as well as hear it, but, when the help is displayed visually, the '486 patent offers no method to prevent the user's primary application from being obstructed by the help displayed. The '486 patent is further limited since it only works with help systems.

Typical prior art voice recognition technology merely substitutes voice commands for keyboard and mouse commands and has not solved these issues of focus and obstruction of the computer user's view of his or her first application, often making it more difficult for a user to control his or her application windows by voice than by using a mouse or keyboard. Specifically, if a computer user of voice recognition software wants to display a help system window, Internet application window or other information content next to his or her working application window so that the windows don't obscure each other's content, the user would have to individually position and size each window by issuing many voice commands to grab the borders of the windows and move and drag them by voice.

A user of prior art voice recognition software working an application window needs to issue three or four commands to follow links in a secondary graphical application window displaying Internet or other content. For example:

First, the user would say, "Switch to next window" and the voice recognition engine will cause the windowing system to switch to the next window.

Second, the user would say, "Products" and the voice recognition engine will cause the Html application window to follow any link that is named "Products" or has "products" in its name, e.g., "New Products." But, if there are two or more links on a displayed page that contain the spoken name, the speech recognition product will number or otherwise uniquely identify the links, forcing the user to issue another command to identify the link he/she wants, for instance:

Third, the user would say, "Choose two." As an alternative to these last two commands, at least one current voice product allows a user to issue a command to number all the links on a displayed page and then the number of the link desired.

And fourth, the user would say, "Switch to next window" and the computer user will be returned to his or her first application window.

Similarly, if a user of prior art voice recognition software wants to switch to another open application on his or her desktop to copy text into the user's first application, it takes at least 5 commands. For instance:

First, the user would say, "Switch to Internet Explorer" and the voice recognition engine might cause the windowing system to switch to the next window. But it may not. Switching between windows by voice is problematic with prior art voice recognition systems when there are many application windows open on the desktop. If there are several copies of Internet Explorer open, the computer user needs to dictate, "Switch to" followed by the exact name of the document e.g., "United States Patent and Trademark Office Home Page." But, how is the user expected to say the name of the document when the user won't be able to see it because the document names are partially or completely hidden on the taskbar when several application windows are open.)

Second, the user would dictate, "Select united through page," and this would cause the voice recognition system to select text on the page.

Third, the user would dictate, "Copy that."

Fourth, the user would say, "Switch to Previous Window" and the computer user will be returned to his or her first application window.

And fifth, the user would dictate, "Paste that" and the previously copied text would be pasted at the cursor position.

Prior art voice recognition help systems also use traditional help with hide/show panes, and search indexes. Thus, they share the weaknesses of other prior art: they cover up part or all of the computer user's application windows, they force the user to switch focus back and forth between the help system and his or her application, and they force the computer user to go through a labyrinth of menus and submenus. For example, to access help about formatting the user needs to follow these steps:

Dictate "What can I say?" or Press "F1"
Dictate or click "Show"
Dictate or type in the word(s) to search for: "format text"
Dictate or click "Select topic"
Dictate "Move down 15" (or more realistically dictate, "Move down 20, then "Move up 5") to move the cursor down 15 lines.
Dictate or click "Hide"
Dictate "Switch to Next Window" (to return to his or her original application) or click on the original application What is needed is system that overcomes these shortcomings of the prior art.

BRIEF SUMMARY OF THE INVENTION

The present invention addresses the foregoing difficulties and teaches and enhanced system with additional capabilities. The present invention creates new systems and methods for using existing voice recognition technology and existing graphical interface technology which is applicable to computer systems including personal computers, workstations and PDAs.

The present invention provides voice activated methods and techniques to enable a computer user working in a graphical application window (a "first" application) to display and retrieve on-screen help, internet, tutorial, e-book, and other information content in another graphical application window (a "second" application). The present invention executes the retrieval of the content specified, re-sizes and repositions, if desired, both the user's displayed first application window and the retrieved second window side-by-side automatically, such that the application windows and content displayed each appear in a separate window with no overlapping of the second window over the first application window, nor of the first application window over the second window. The invention maintains or quickly returns the user's input focus and/or mouse position to the user's original position in the first application window.

The present invention provides a suite of pre-set and interactive voice commands that permit users to manipulate a second graphical application window and the text and/or other information that is displayed in the second window, such as by scrolling such information up and down, enlarging or diminishing the second window, printing the content, or copying specified text from the second window, while remaining in productive control of his or her first application window, automatically, with minimal interruption by the process of requesting, receiving the content, and/or controlling the second application.

This invention brings many advantages over existing technology. Help systems accessed through this invention appear positioned adjacent to a working application to assist a user with context specific, step-by-step, instructions, thus making the help appear integrated into the application from which it was called. Additionally, when help is accessed through this invention, the focus is not shifted from the application to the help provided, but instead remains with the application. Thus, the user can perform the instructions provided by the help without having to remember to switch back to the application window to return focus before proceeding.

Similarly, when Web pages, e-books and other information content are accessed through this invention, the focus is not shifted from the application to the content provided, but instead remains with the application. The user can read the content provided by the e-book or other material, can page or scroll through it, can copy and paste from it, and can take notes from it without having to switch back and forth between the content and his or her working application countless times.

Specifically, the present invention enables a computer user to perform the following functions in a second graphical application window while remaining in productive control of his or her primary graphical application window:

Operate and control by voice a help system that provides one command access to all help topics;

Operate and control an internet browser by voice;

View and manipulate data in second application windows;

Copy data to user's active application from second application windows.

Access, control content, and follow links in tutorials, demonstrations, help files, html content, and other information located either on a user's computer, on a computer network, or on the World Wide Web;

Operate and control by voice a graphical application window displaying a help system or other content that automatically sizes the graphical application window to optimally display its content and simultaneously resize the user's primary graphical application window to tile side by side with this graphical window, if desired.

BRIEF DESCRIPTION OF THE SEVERAL VIEWS OF THE DRAWINGS

FIG. 8 is a representative screen display of a computer's users desktop after following a hyperlink. Focus is returned to the user's application, allowing user to keep following hyperlinks.

DETAILED DESCRIPTION OF THE INVENTION

The present invention, generally, provides a speech interface giving a computer user increased access to, control of, and usability of online help, and other types of information content. First, a description of the computer hardware and software requirements is provided. Next, the basic windowing concepts used by the invention is described. Next, a brief description about voice recognition command files is provided. And last, the preferred embodiment is described in detail.

The present invention shall be described with respect to a Windows based operating system and ScanSoft's Dragon NaturallySpeaking product. However, the invention as disclosed herein is not so limited. Instead, the invention can be used with most voice recognition systems, including IBM ViaVoice, Microsoft Speak and with SDK's available from most vendors of speech recognition engines. The invention is designed to operate with any one of several commercially available operating systems, which incorporate a graphical user interface. In this embodiment, the Dragon NaturallySpeaking scripting language is used as is the WinBatch editor compiler. Several other programming languages, including "C", Visual Basic may be used.

Figure 1:
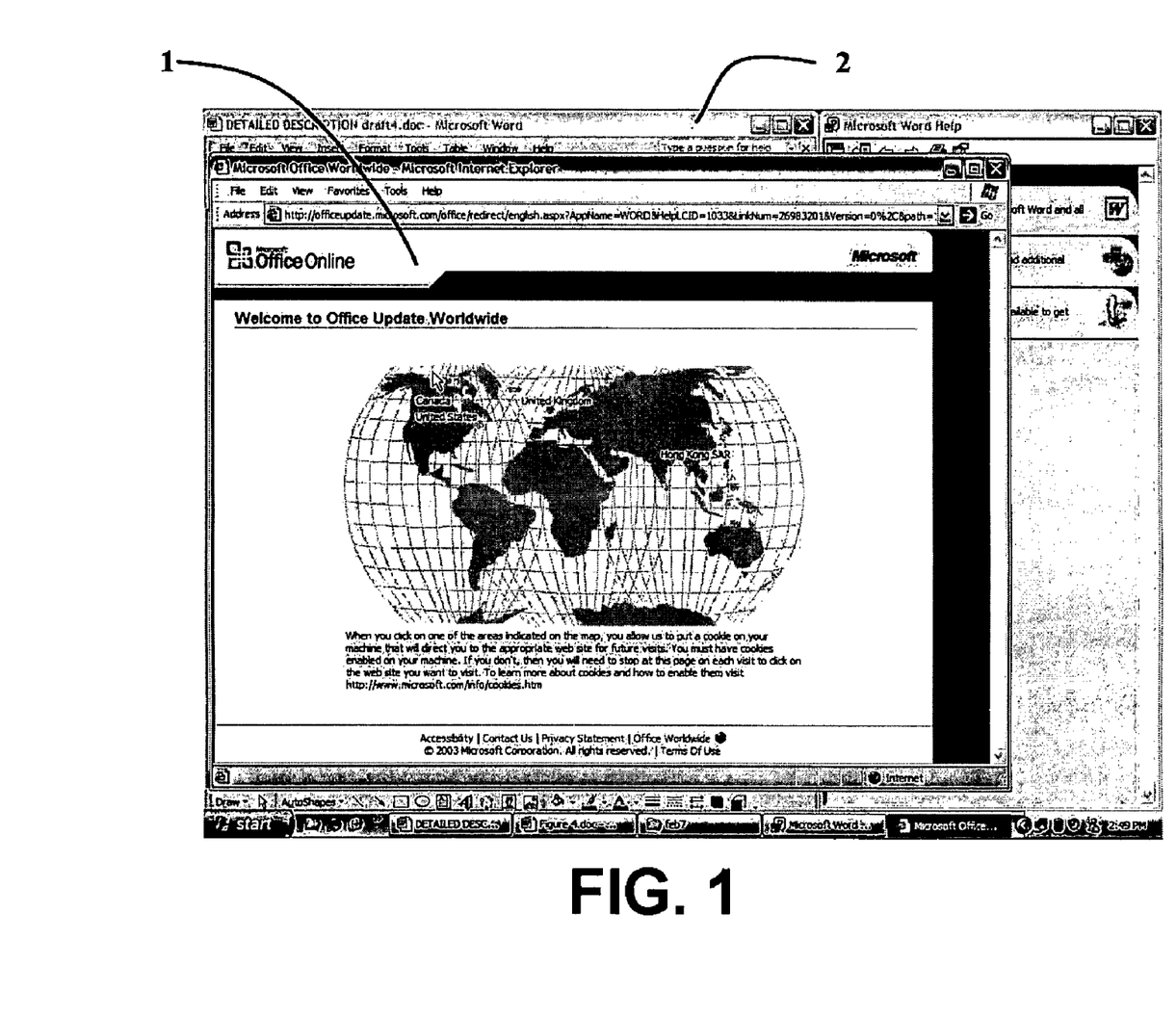
FIG. 1 (prior art) is a representative screen display of a prior art help system with its auto-tiling feature turned on. The link in the help document referred user to a web site.

Virtually all help systems provide hyperlinks to web pages, so that their users can find more complete and recent information. As FIG. 1 illustrates, in a typical prior art environment, as soon as a computer user clicks on a hyperlink to access the web, an Internet application window (e.g., Internet Explorer 1) opens, partially or totally obscuring the user's first application 2 and causes the user to lose focus from his/her graphical application window.

Figure 2:
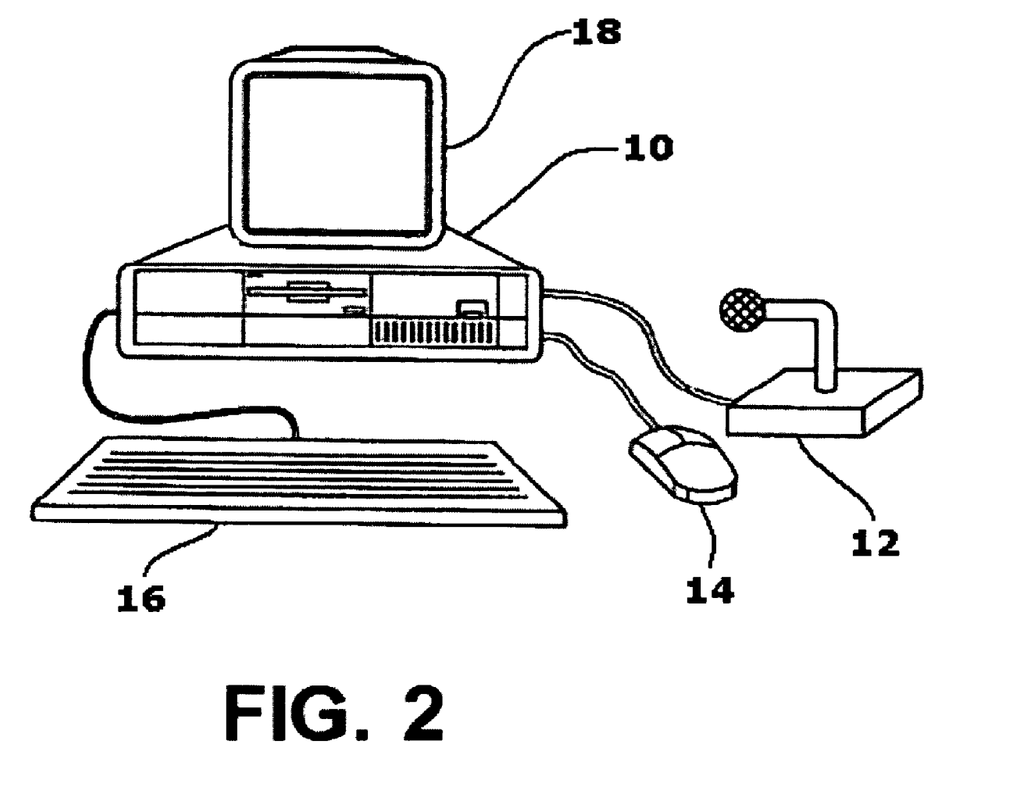
FIG. 2 is a diagrammatic illustration of a computer executing a computer application according to an example implementation of this invention.

FIG. 2 illustrates generally the environment utilizing the present invention. In FIG. 2, the invention is described within the illustrated context of a familiar desktop computer. An example computer 01 includes a Pentium IV-equivalent microprocessor with at least two hundred and fifty-six or more megabytes of RAM. This example computer is capable of running a multitasking operating system with a graphical user interface windowing environment. However, aspects of this invention might also be employed in other forms of computing devices such as laptop computers, hand held computers, portable personal information managers (PIMs), and the like. In these devices, the application may be configured to run on a single-tasking operating system.

The computing device must include an internal audio input and output circuit, commonly referred to as a "sound card" or an external USB sound digitizing device. A microphone 12 is connected to the audio input. The sound card converts digital information from the computer into audio signals and digitizes audio signals received from the microphone into data that can be manipulated by the microprocessor and other components of the computer. The computing device can also include a conventional keyboard 16 and mouse 14 allowing the user to input information in a conventional fashion. A video monitor 18 is provided for the display of information by the computer.

Turning to basic window concepts, the present invention is concerned with the "focus" of the operating system and with displaying and controlling online information including help information, Web pages, e-books and other information content to a user. At any given time, one window is designated as the "focus window"; any key press or key release events for the display are sent to that window. A window is said to have "focus" when it is active and currently designated to receive the user input from the keyboard, mouse, a voice recognition system, or other input device.

In a graphical user interface, a window displays the contents of files, whether that file contains Web pages, help information, e-books, or other information content. Windows can be opened full-screen or can be sized and positioned anywhere on the desktop. A window can be open on the desktop but its content can be partially or totally obscured by other windows also open on the desktop. A window can be open but positioned off the computer's screen so that it is hidden from the user. Windows that are displayed adjacent to one another are referred to as "tiled windows." If a computer user is working in, and has focus in, a graphical application window, that application is considered the "first" application. All other windows are considered "second" applications.

To understand the invention, it is necessary to know how voice recognition systems distinguish commands from non-command words. Examples of commands are: "page down," "go to top," and "print that." These command words (or phrases) are stored in command files. The speech engine reads its command files when it is opened and places the commands listed in the command files into active memory, making these commands "active", allowing the speech recognition engine to recognize these commands when spoken by a computer user. This is typical of the art. To instruct a voice recognition system to understand the invention's spoken commands, this invention modifies one or more of the speech recognition engine's command files by adding the invention's own command words to that of the speech engine's command list, which are then read by the speech recognition engine. The invention sometimes refreshes these command files during normal use.

Different speech engines and different versions of the same speech engine have various ways of storing commands and use different scripting or programming languages. Other embodiments of this program will work with speech engines through their own scripting languages or through third-party scripting languages. These scripting languages act as an intermediary between a commercial speech engine and a programming language such as "C" or WinBatch, which are required for this invention.

Figure 3:
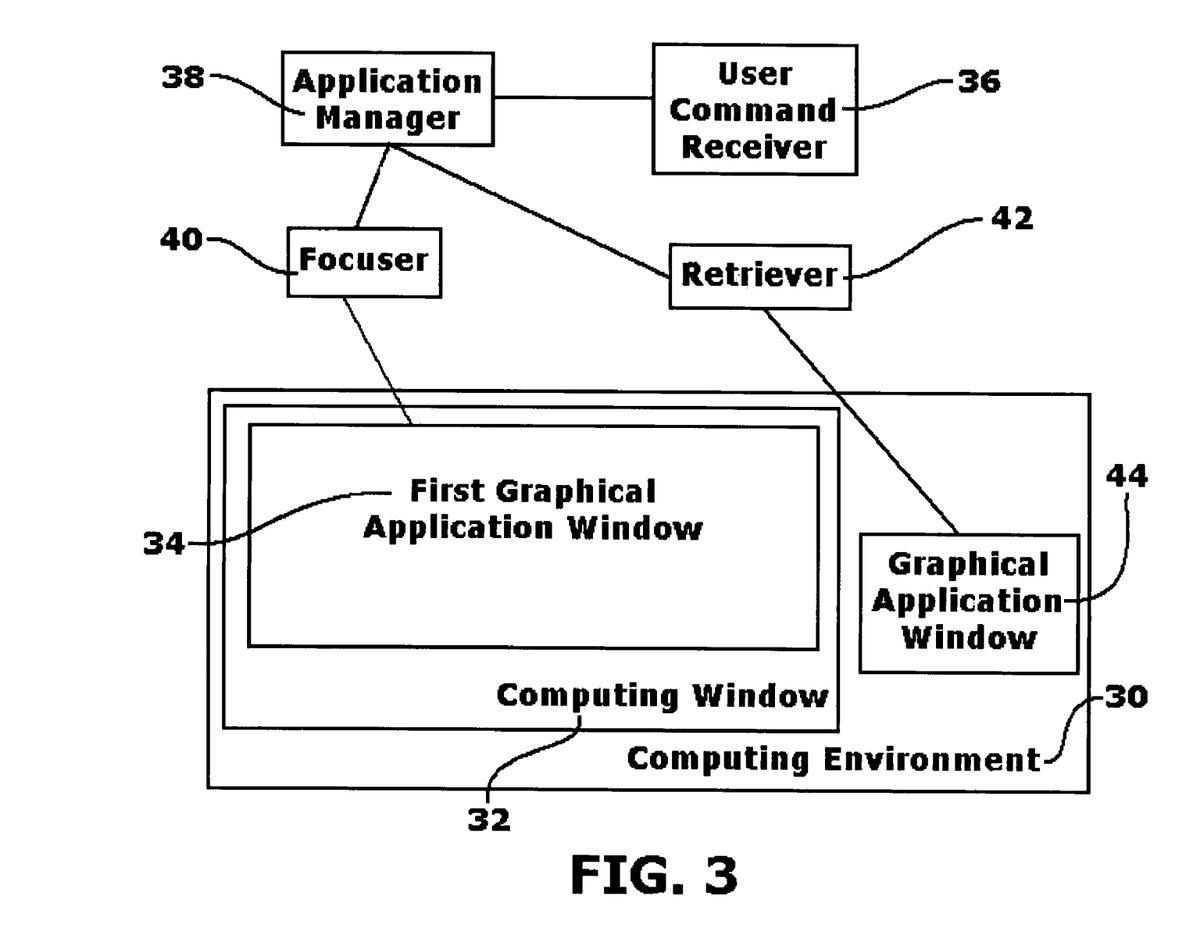
FIG. 3 is a schematic of the interrelationships between the parts of the program.

FIG. 3 is a block diagram showing a graphical application window 34 in a computing window 32 in a computing environment 30. Dragon NaturallySpeaking, a speech recognition engine, is open on the desktop. The microphone is on and active. The computer user, with input focus in the application window, referred to as the "first" graphical application window, dictates a voice command. When the speech recognition engine recognizes a voice command as an invention command, it passes the command to the invention's user command receiver 36 initiating the invention's application manager 38. In the preferred embodiment, the application manager performs the following steps:

The application manager interprets the voice command and parses out the name of the graphical application window and parses out the specified file name, if any.

The application manager identifies the graphical application window having input focus 34, as the first graphical application window.

The application manager invokes the retriever 42, passing the retriever the parsed out graphical application window name and the parsed out specified file name, if any. The retriever opens or reactivates the graphical application window 44 and the specified file, if any. As the graphical application window is opened, single threading operating systems such as Microsoft Windows will cause the first graphical application window to lose focus.

The application manager waits for the graphical application window to be opened or reactivated.

Figure 4:
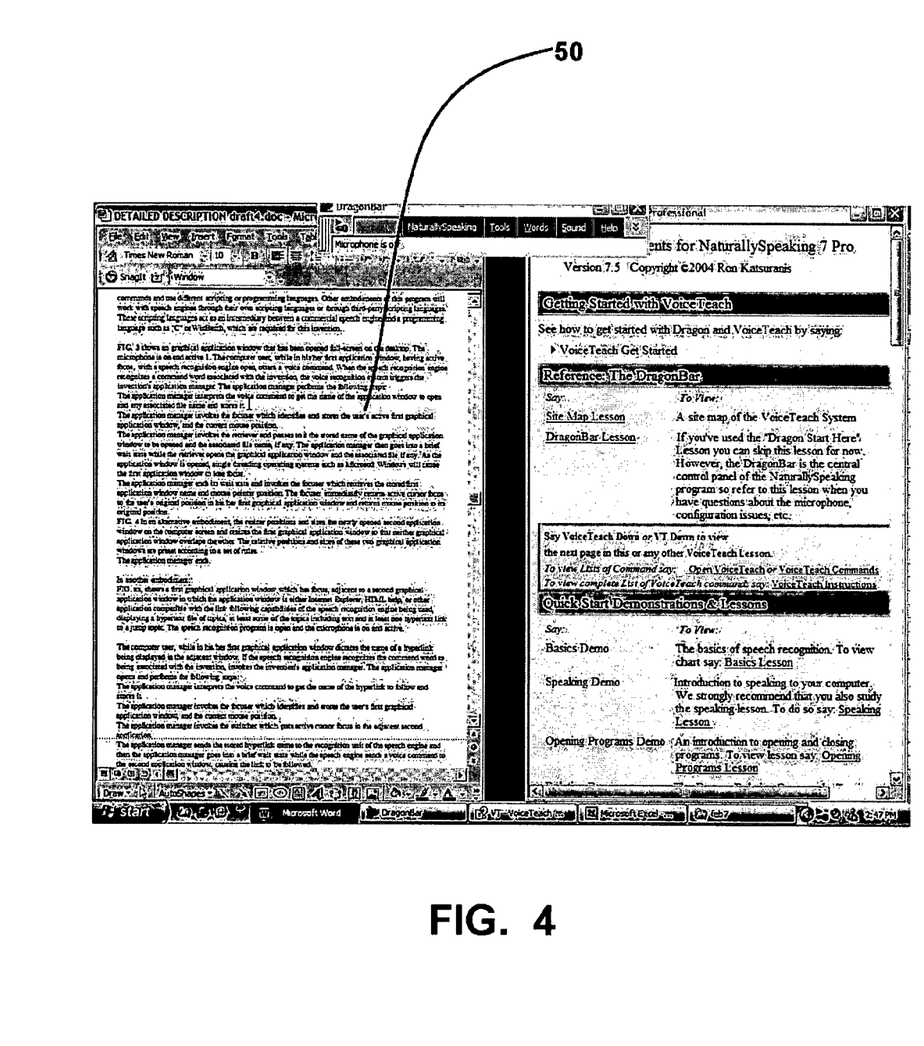
FIG. 4 is a representative screen display of a computer's users desktop after invoking the invention.

The application manager invokes the focuser 40 passing the focuser the name of the first graphical application window and the focuser reactivates the said window. FIG. 4 illustrates that the focuser returned input focus to the user's original cursor position in his/her first graphical application window 50.

Figure 5:
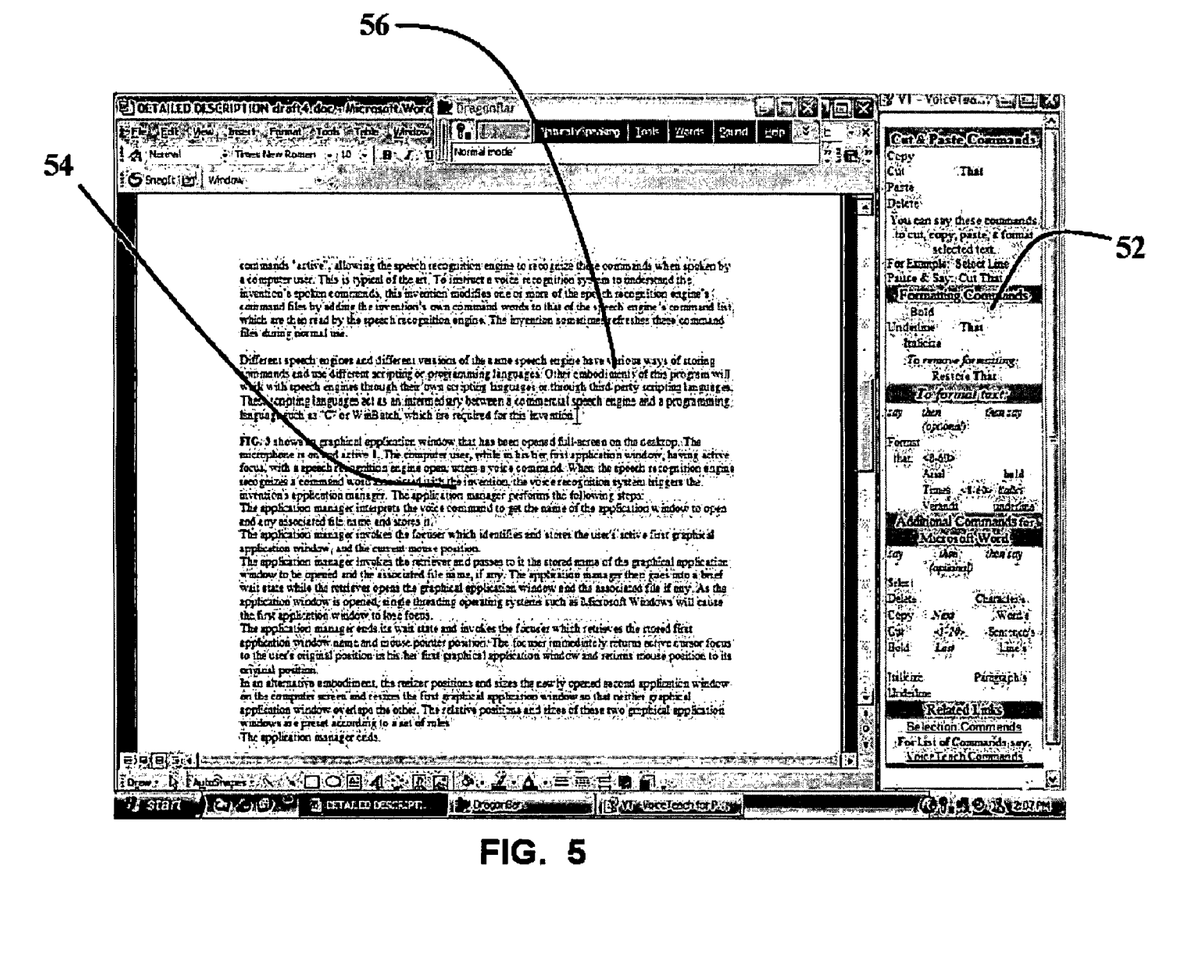
FIG. 5 is a representative screen display of a computer's users desktop after invoking the invention with automatic resizing turned on and with mouse being returned to original position.

The present invention offers significant advantages to prior art approaches. Using this invention, any topic or subject in a help system can be accessed with a single voice command, whether or not the help system is open. For example, to view help on formatting text, a user need only say, "Formatting commands." The Invention then executes the retrieval of the content specified by the spoken command, displays the content in a graphical application window adjacent to the user's first application window as is illustrated in FIG. 5. The preferred embodiment allows the user to remain in productive control of his/her first application window, automatically, with minimal interruption by the process of requesting and receiving the content. The computer user is able to view the content 52 and perform the instructions provided by the help 54 without having to remember to switch back to the first graphical application window to return focus before proceeding.

FIG. 5 also illustrations an alternative embodiment where the resizer positions and sizes the newly opened second application window 52 on the computer screen and resizes the first graphical application window 54 so that neither graphical application window overlaps the other. The relative positions and sizes of these two graphical application windows are preset according to a set of rules. The mouse is returned to its original position 56.

Figure 6:
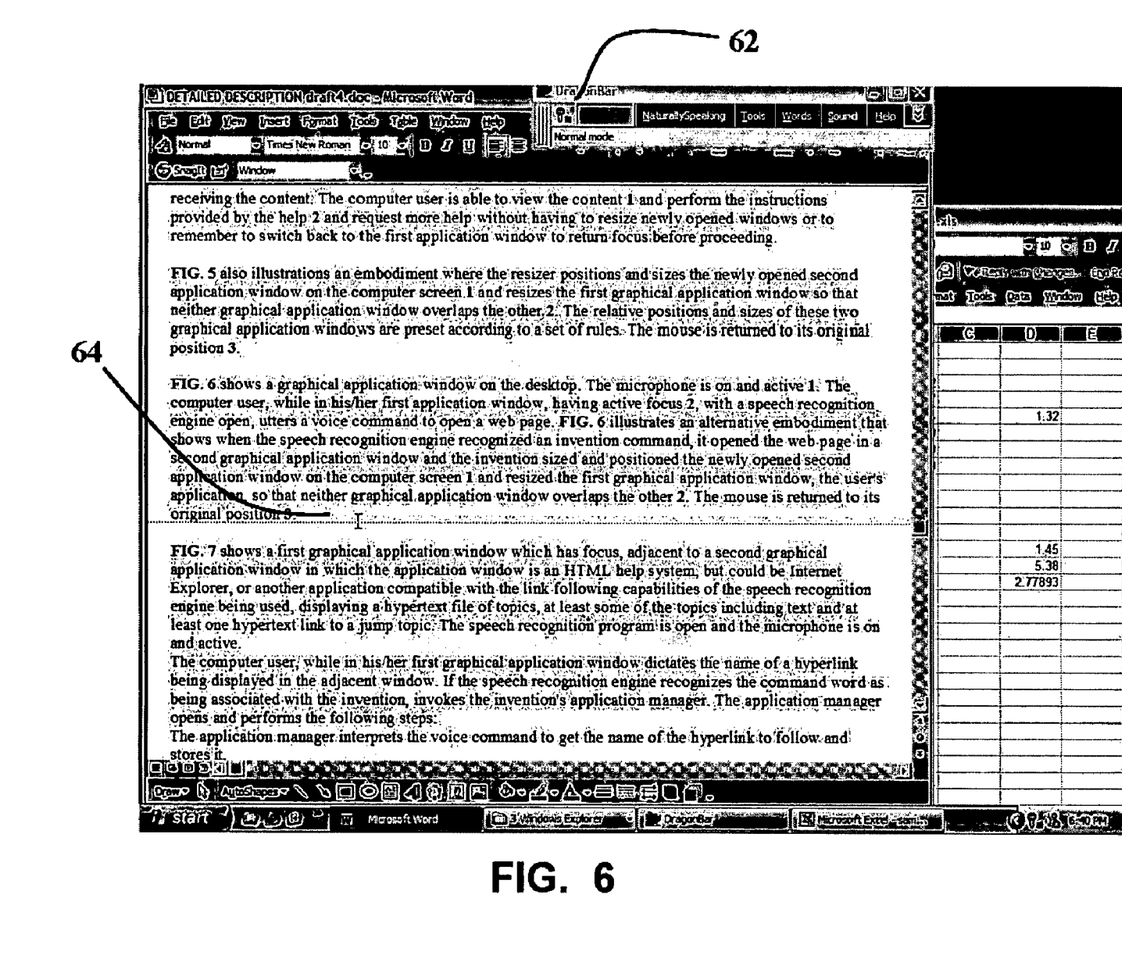
FIG. 6 is a representative screen display of a computer's users desktop before invoking the invention.
Figure 7:
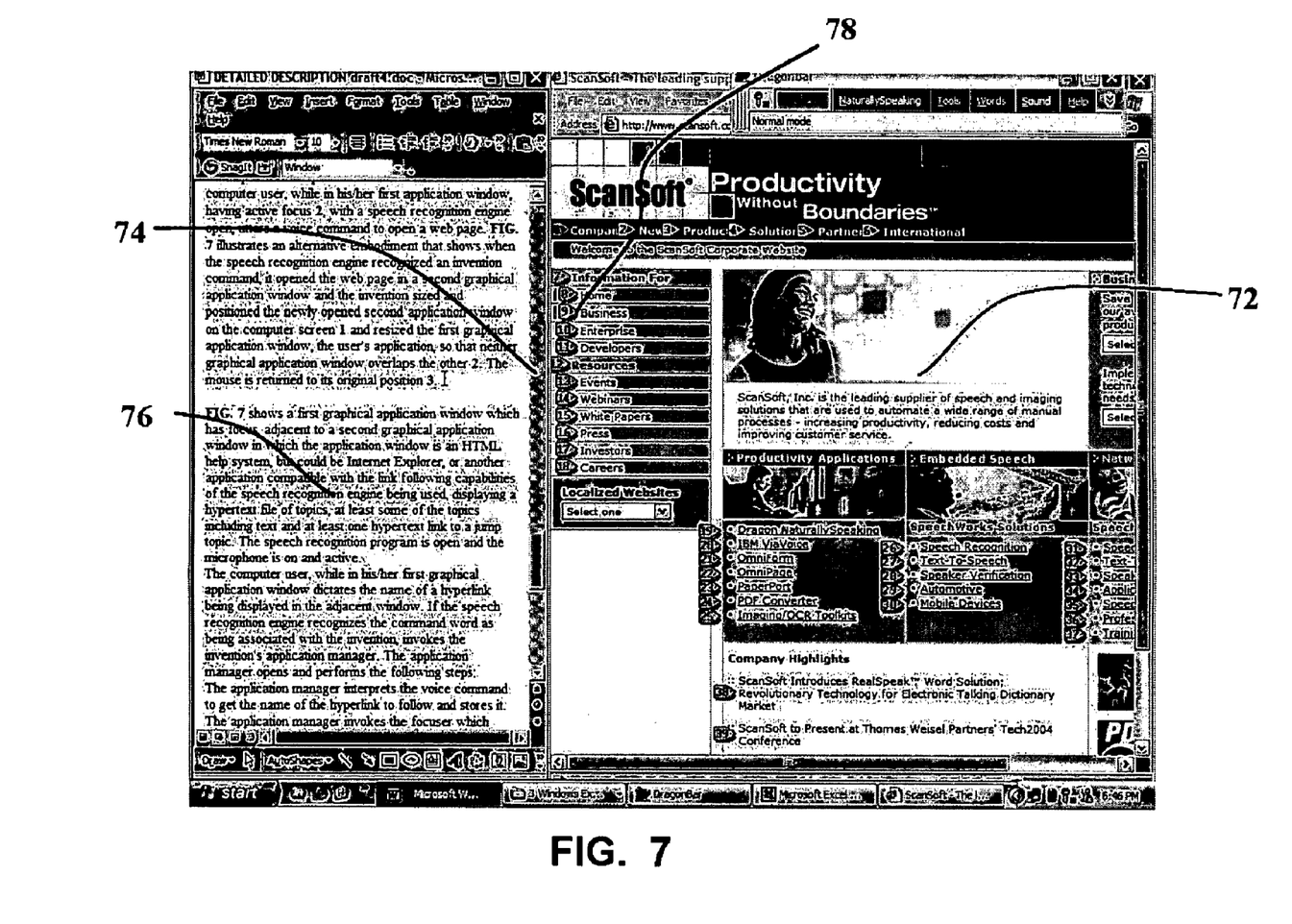
FIG. 7 is a representative screen display of a computer's users desktop after invoking the invention. The newly opened web page is resized next to the user's application, the hyperlinks on the page are identified and focus returns to the user's application.

FIG. 6 illustrates an alternative embodiment, showing a graphical application window on the desktop. In this example and not by way of limitation, the microphone is on and active 62 and the computer user, with input focus in his/her first graphical application window 64, with a speech recognition engine open, dictates a voice command to open a web page. The result of the computer user's dictated voice command to open a web page is illustrated in FIG. 7. The web page is displayed in the second graphical application window 72 adjacent to the first graphical application window 74 so that neither graphical application window overlaps the other. In this alternative embodiment, all the links on the web page are uniquely numbered by the invention 78. Further, the invention also reformats the display of the text in the first application window so that it is legible and not hidden 76.

Once a user has opened a second graphical application window as in FIG. 7, said window displaying Internet Explorer, an HTML help system, or another application compatible with the link following capabilities of the speech recognition engine being used, a computer user can follow the hyperlinks being displayed in the second graphical application window 72. The computer user, with input focus in his/her first graphical application window, dictates an invention command with the number of a hyperlink being displayed in the second graphical application window. For instance the user would dictate the command, "Web 9."

When the speech recognition engine recognizes the command as an invention command, it passes the command to the invention's user command receiver initiating the invention's application manager which parses out the name of the hyperlink, "9".

The application manager identifies the graphical application window having input focus, in this example Microsoft Word, as the first graphical application window.

The application manager invokes the focuser specifying the second graphical application window, putting input focus in the said application.

The application manager invokes the speech simulator, specifying the hyperlink name. The speech simulator sends the hyperlink name as a dictated command, as if the computer user was speaking directly to the speech recognition engine, causing the speech recognition engine to follow the hyperlink.

The application manager delays execution for a brief time, allowing the speech engine to initiate the following of the hyperlink.

The application manager invokes the focuser passing the focuser the name of the first graphical application window and the focuser reactivates the said window. And, in an alternative embodiment, the application manager returns the mouse pointer position to its position at the time the invention was invoked and positions and sizes the newly opened second graphical application window on the computer screen and resizes the first application window so that neither application window overlaps the other. The relative positions and sizes of these two application windows are preset according to a set of rules.

The application manager ends.

The previous embodiment provides another major advantage over prior art. Most current help systems provide HTML links to up-to-date help information and to related topics. A user of the invention can follow these links from his/her first application window with voice commands. The information obtained will not obscure the user's working application as it does in all prior art systems.

In an alternative embodiment, a computer user, with input focus in the first graphical application window, FIG. 3, dictates a voice command. When the speech recognition engine recognizes a voice command as an invention command, it passes the command to the invention's user command receiver 36 initiating the invention's application manager 38. In this embodiment, the application manager performs the following steps:

The application manager identifies the application window having input focus as the first graphical application window 34, then identifies the second graphical window according to preset conditions.

The application manager invokes the switcher 42, passing the switcher the specified graphical application window. The switcher reactivates the specified graphical application window 44, giving it input focus.

The application manager invokes the pauser, wherein the pauser is preset to expire after a brief time.

The input focus stays in the specified graphical application window allowing the computer user to issue voice commands to the application contained in specified graphical window until the pauser expires.

For example, and not by way of limitation, the computer user can say a formatting command, hyperlink name, or cursor movement command.

The pauser expires, the application manager then invokes the focuser 40 passing the focuser the name of the first graphical application window and the focuser reactivates the said window. In a further embodiment and not be way of limitation, if the computer user has followed a link to another html page, the invention will resize and position the first graphical application window and the second graphical application window such that neither window overlaps the other.

The above mentioned embodiments of this invention make it possible for a computer user in a first graphical application window to open another graphical application window, size and position it next to the first graphical application window, allowing the user to view information content without losing his/her input focus. A previous mentioned embodiment enables a user to follow hyperlinks on the Internet, in a help system, in an e-book or other html environment, while remaining in productive control of the first graphical application window.

An alternative embodiment of this invention extends the usefulness of this invention by making it possible for a computer user to issue voice commands to a second graphical application window and still remain in productive control of the user's first graphical application window. In this embodiment, once a user has opened a second graphical application window containing an application capable of being controlled by voice commands from a speech recognition engine, as in FIG. 7. The computer user, with input focus in his/her first graphical application window, dictates an invention command.

When the speech recognition engine recognizes the command as an invention command, it passes the command to the invention's user command receiver initiating the invention's application manager which parses out the name of the voice command to be sent to the second graphical application window.

The application manager identifies the graphical application window having input focus, as the first graphical application window.

The application manager invokes the focuser specifying the second graphical application window, putting input focus in the said application.

The application manager invokes the speech simulator, specifying the name of the voice command. The speech simulator sends the voice command as a dictated command, as if the computer user was speaking directly to the speech recognition engine, causing the speech recognition engine to initiate the execution of the voice command.

The application manager delays execution for a brief time, allowing the speech engine to initiate the execution of the voice command.

The application manager invokes the focuser passing the focuser the name of the first graphical application window and the focuser reactivates the said window. The application manager ends.

Another aspect of the invention allows a user, in a first application window, to copy and paste specified text from a second graphical application window. This system allows a user of the invention to use voice commands to copy and paste text faster and easier and allows a user to copy text from any virtually any graphical application window that contains text and not just a voice enabled graphical window as do voice recognition systems.

Once a user has opened a second graphical application window, the computer user, with input focus in his/her first graphical application window, dictates a command to initiate the copying of text.

When the speech recognition engine recognizes the command as an invention command, it passes the command to the invention's user command receiver initiating the invention's application manager. The application manager parses out the name of the voice command to be sent to the second graphical application window.

The application manager identifies the graphical application window having input focus, as the first graphical application window.

The application manager invokes the focuser specifying the second graphical application window.

The application manager saves the computer's clipboard contents, clears the clipboard's contents, and invokes the copying unit. The copying unit delays processing until the computer user selects text or cancels the process. Once text is selected, the copying unit copies the text into the clipboard and closes.

The application manager invokes the focuser passing the focuser the name of the first graphical application window and the focuser reactivates the said window.

The application manager then pastes the copied text into the first graphical application window and closes.

It should be emphasized that the above-described embodiments, particularly any "described" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure. The detail presented above is given by way of illustration, not limitation. The invention should only be limited by the claims as set forth below.

An embodiment of the present invention may comprise a computer readable medium comprising code segments for navigating the display of content in a windowed computing environment. The code segments may be embodied on any suitable computer readable medium, including any disk medium (e.g., magnetic disk, optical disk, etc.), or any suitable non-volatile semiconductor memory (e.g., Flash), or any suitable combination thereof, or any other suitable non-volatile memory intended to be accessed by a suitable computing device.

The invention claimed is:

1. A system for navigating the display of content in a windowed computing environment, the system comprising a computing device comprising:
   a voice recognition engine;
   a first application comprising a first window;
   a second application comprising a second window, the second window comprising a scroller for scrolling through the content of the second window;
   a user command receiver for receiving a command for invoking the scroller to scroll through the content of the second window while input focus is on the first window from the voice recognition engine and in response to the command for invoking the scroller:
   setting input focus on the second window; and
   after setting input focus on the second window, an application manager for scrolling through the content of the second window and switching focus back to the first window independent of user input.

2. A system for navigating the display of content in a windowed computing environment, the system comprising a computing device comprising:
   a voice recognition engine;
   a first application comprising a first window;
   a second application comprising a second window, the second window comprising a linker for following a hyperlink in the second window;
   a user command receiver for receiving a command for invoking the linker for following hyperlinks in the second window while input focus is on the first window from the voice recognition engine and in response to the command for invoking the linker:
   setting input focus on the second window; and
   after setting input focus on the second window, an application manager for following the hyperlink in the second window and switching focus back to the first window independent of user input.

3. A computer readable medium comprising code segments for navigating the display of content in a windowed computing environment, the code segments for:
   receiving a voice command for scrolling through the content of a second window while input focus is on a first window and in response to the voice command:
   setting input focus on the second window; and
   after setting input focus on the second window, scrolling through the content of the second window and switching focus back to the first window independent of user input.

4. A computer readable medium comprising code segments for navigating the display of content in a windowed computing environment, the code segments for:
   receiving a voice command for following a hyperlink in a second window while input focus is on a first window and in response to the voice command:
   setting input focus on the second window; and
   after setting input focus on the second window, following the hyperlink in the second window and switching focus back to the first window independent of user input.

* * * * *